(12) United States Patent
Tang et al.

(10) Patent No.: US 9,804,697 B2
(45) Date of Patent: Oct. 31, 2017

(54) DOUBLE-LAYER TOUCH SCREEN AND METHOD FOR MAKING THE SAME

(71) Applicant: SHENZHEN O-FILM TECH CO., LTD., Shenzhen (CN)

(72) Inventors: Genchu Tang, Shenzhen (CN); Shengcai Dong, Shenzhen (CN); Wei Liu, Shenzhen (CN); Bin Tang, Shenzhen (CN)

(73) Assignee: Shenzhen O-Film Tech Co., Ltd., Shenzhen (CN)

( * ) Notice: Subject to any disclaimer, the term of this patent is extended or adjusted under 35 U.S.C. 154(b) by 480 days.

(21) Appl. No.: 14/249,180

(22) Filed: Apr. 9, 2014

(65) Prior Publication Data

US 2014/0307183 A1 Oct. 16, 2014

(30) Foreign Application Priority Data

Apr. 12, 2013 (CN) .......................... 2013 1 0127993

(51) Int. Cl.
*G06F 3/041* (2006.01)

(52) U.S. Cl.
CPC .... *G06F 3/041* (2013.01); *G06F 2203/04103* (2013.01)

(58) Field of Classification Search
CPC ............ G06F 3/041; G06F 2203/04103; C09J 133/08; C09J 133/10; C09J 133/12
USPC .................................................. 345/173–174
See application file for complete search history.

(56) References Cited

U.S. PATENT DOCUMENTS

| 2002/0025441 A1* | 2/2002 | Hieda | ............... B32B 17/10018 |
| | | | 428/440 |
| 2005/0083307 A1* | 4/2005 | Aufderheide | ........... G06F 3/044 |
| | | | 345/173 |
| 2010/0279067 A1* | 11/2010 | Sabia | .................... C03B 17/064 |
| | | | 428/141 |

(Continued)

FOREIGN PATENT DOCUMENTS

| CN | 101599315 A | 12/2009 |
| CN | 102903423 A | 1/2013 |

(Continued)

*Primary Examiner* — Sophie Hon
(74) *Attorney, Agent, or Firm* — Hodgson Russ LLP (57) ABSTRACT

The present invention discloses a double-layer touch screen, comprising: a transparent cover glass; a first transparent embossed adhesive layer; a first conductive layer embedded in the first transparent embossed adhesive layer and including a plurality of first conductive strips extending along a first direction, the first conductive strip is formed by intersection of conductive wires; a second transparent embossed adhesive layer; a second conductive layer embedded in the second transparent embossed adhesive layer and including a plurality of second conductive strips extending along a second direction, wherein the second conductive strip is formed by intersection of conductive wires; and a transmission reinforcement layer. The double-layer touch screen uses the first conductive layer and the second conductive layer to replace ITO layer used in conventional touch screen. This type of double-layer touch screen can ensure light transmittance and conductivity and reduce cost due to the cheaper material, without additional etching technique.

16 Claims, 7 Drawing Sheets

(56) References Cited

U.S. PATENT DOCUMENTS

| | | | | |
|---|---|---|---|---|
| 2011/0102370 A1* | 5/2011 | Kono | ................... | G06F 3/044 |
| | | | | 345/174 |
| 2013/0120287 A1* | 5/2013 | Oh | ................... | G06F 3/0418 |
| | | | | 345/173 |
| 2013/0161070 A1* | 6/2013 | Lee | ................... | H05K 3/105 |
| | | | | 174/250 |
| 2013/0164543 A1* | 6/2013 | Shibuya | ................ | G06F 1/1643 |
| | | | | 428/428 |
| 2013/0279007 A1* | 10/2013 | Kawai | ................ | C03C 17/3417 |
| | | | | 359/586 |
| 2013/0299216 A1* | 11/2013 | Ichiki | ................... | G06F 3/044 |
| | | | | 174/255 |
| 2014/0062905 A1* | 3/2014 | Lee | ................... | G06F 3/0488 |
| | | | | 345/173 |

FOREIGN PATENT DOCUMENTS

| | | |
|---|---|---|
| CN | 202758338 U | 2/2013 |
| CN | 103218081 B | 8/2014 |

\* cited by examiner

DOUBLE-LAYER TOUCH SCREEN AND METHOD FOR MAKING THE SAME

CROSS-REFERENCE TO RELATED APPLICATIONS

This application claims priority to Chinese Patent Application No. 201310127993.4, filed on Apr. 12, 2013, entitled "Double-layer Touch Screen and Method for Making the Same", which is incorporated herein by reference in its entirety.

FIELD OF THE TECHNOLOGY

The present invention relates to photoelectrical field, and particularly to a double-layer touch screen and method for making the same.

BACKGROUND

Touch screen is a sensing device for receiving an input signal such as touch. Touch screen that gives information interaction a new look is an attractive and whole new information interactive device. Development of touch-screen technology has aroused widespread attention from domestic and foreign information media, becoming a sunrise high technology industry suddenly emerging in photoelectrical field.

Depending on whether each area of the touch screen is transparent, the area coated with ink may be referred to as a non-visible area, and the area not coated with ink may be referred to as a visible area. Sensing area of the touch screen is usually set in the visible area.

Currently, ITO (indium tin oxide) layer is a vital component of a touch screen module. Although the technology for manufacturing touch screens has been rapidly developed at a tremendous pace, basic manufacturing process for ITO layers, for example in projected capacitive screen, has not changed too much in recent years. Such manufacturing process inevitably needs to coat and pattern ITO film.

Indium is an expensive metal material and the use of ITO as conductive layer material will significantly increase the cost of the touch screen. Furthermore, in the process of patterning ITO conductive layer, the entire ITO layer coated needs to be etched, so as to form an ITO pattern. In this process, a large amount of ITO is etched away, resulting in serious waste of this precious metal, environment pollution and high cost.

SUMMARY

Based on this, it is necessary to provide a relatively low-cost double-layer touch screen.

A double-layer touch screen includes:
a transparent cover glass;
a first transparent embossed adhesive layer laminated on one surface of the transparent cover glass and defined a grid-like first groove thereon, wherein the refractive index of the transparent cover glass is greater than that of the first transparent embossed adhesive layer;
a first conductive layer embedded in the first transparent embossed adhesive layer and including a plurality of first conductive strips extending along a first direction, wherein the first conductive strips each is formed by intercrossing conductive wires that are formed by curing or solidifying a conductive material filled in the first groove;
a second transparent embossed adhesive layer laminated on the first transparent embossed adhesive layer and defined a grid-like second groove thereon, wherein the refractive index of the first transparent embossed adhesive layer is not less than that of the second transparent embossed adhesive layer;
a second conductive layer embedded in the first transparent embossed adhesive layer and including a plurality of second conductive strips extending along a second direction, wherein the second conductive strips each is formed by intercrossing conductive wires that are formed by curing or solidifying a conductive material filled in the second groove; and
a transmission reinforcement layer covering on the second transparent embossed adhesive layer, wherein the refractive index of the second transparent embossed adhesive layer is greater than that of the transmission reinforcement layer, and the refractive index of the transmission reinforcement layer is greater than that of air;
wherein the first direction is not parallel to the second direction, and the first conductive strips and the second conductive strips are spaced apart and insulated from each other in a thickness direction of the transparent cover glass.

In an embodiment, the transmission reinforcement layer may be formed by a heat curable resin or an ultraviolet curable resin, and has a thickness of 0.5 μm-5 μm.

In an embodiment, the heat curable resin includes the following components based on 100 parts by mass:
50 parts to 80 parts of a polymer resin, 10 parts to 40 parts of a solvent, 0.1 parts to 5 parts of a leveling agent, 0.1 parts to 5 parts of a defoaming agent and 0.1 parts to 5 parts of a plasticizer;
wherein the polymer resin is at least one selected from the group consisting of a polyester resin, a polyurethane resin, an acrylic ester, an epoxy resin and a vinyl ether;
the solvent is at least one selected from the group consisting of ethanol, n-butanol, ethylene glycol-butyl ether, butyl acetate, cyclohexanone, and glycidyl ether;
the leveling agent is at least one selected from the group consisting of polyacrylate, cellulose acetate butyrate, nitrocellulose and polyvinyl butyral;
the defoaming agent is at least one selected from the group consisting of phosphate defoaming agent, fatty acid ester defoaming agent and silicone defoaming agent; and
the plasticizer is at least one selected from the group consisting of phthalic acid ester, diisononyl phthalate, diisodecyl phthalate and trimellitic acid ester.

In an embodiment, the ultraviolet curable resin includes the following components based on 100 parts by mass:
60 parts to 80 parts of an organic monomer, 10 parts to 30 parts of a diluent, 0.01 parts to 1 part of a photoinitiator, 0.2 parts to 2 parts of a stabilizer, 0.2 parts to 2 parts of a leveling agent, 0.3 parts to 2 parts of a defoaming agent and 0.5 parts to 3 parts of a plasticizer;
wherein the organic monomer is at least one selected from the group consisting of acrylic ester, epoxy resin and vinyl ether;
the diluent is at least one selected from the group consisting of tripropylene glycol diacrylate, trimethylolpropane triacrylate, ethoxylated trimethylolpropane triacrylate, dipentaerythritol hexaacrylate, 1,6-hexanediol methoxy monoacrylate and ethoxylated neopentyl glycol methoxy monoacrylate;
the photoinitiator is at least one selected from the group consisting of aromatic diazonium salt, aromatic sulfonium salt, aromatic iodonium salt and ferrocenium salt;

the stabilizer is at least one selected from the group consisting of hydroquinone, p-methoxyphenol, p-benzoquinone, 2,6-di-t-butyl methyl phenol, phenothiazine, and anthraquinone;

the leveling agent is at least one selected from the group consisting of polyacrylate, cellulose acetate butyrate, nitrocellulose and polyvinyl butyral;

the defoaming agent is at least one selected from the group consisting of phosphate defoaming agent, fatty acid ester defoaming agent and silicone defoaming agent; and the plasticizer is at least one selected from the group consisting of phthalic acid ester, diisononyl phthalate, diisodecyl phthalate and trimellitic acid ester.

In an embodiment, the first conductive layer may be formed by a metal or alloy thereof, carbon nanotube, graphene, organic conductive polymer, or ITO; and the second conductive layer may be formed by a metal or alloy thereof, carbon nanotube, graphene, organic conductive polymer, or ITO.

In an embodiment, the metal is at least one selected from the group consisting of gold, silver, copper, aluminum, nickel, and zinc.

In an embodiment, the conductive wires each has a width of 0.2 µm-5 µm and a thickness of 1 µm-10 µm, where the intersection point of any two intercrossing conductive wires forms a node, and the distance between any two adjacent nodes is 50 µm-500 µm.

In an embodiment, the first transparent embossed adhesive layer and the second transparent embossed adhesive layer each may be formed by a heat curable resin or an ultraviolet curable resin; and the first transparent embossed adhesive layer has a thickness of 1 µm-10 µm, and the second transparent embossed adhesive layer has a thickness of 1 µm-10 µm.

In an embodiment, the transparent cover glass may be an aluminosilicate glass or a soda lime glass and has a thickness of 0.3 mm-1.2 mm, and Si—O groups on the surface of the transparent cover glass facing the first transparent embossed adhesive layer bond to the first transparent embossed adhesive layer.

In an embodiment, the surface of the transparent cover glass facing the first transparent embossed adhesive layer has a roughness of 2 nm-8 nm.

A method for making double-layer touch screen, including the following steps:

providing a transparent cover glass, and treating one surface of the transparent cover glass;

coating an embossed adhesive on the treated surface of the transparent cover glass, to form a first transparent embossed adhesive layer, where the refractive index of the transparent cover glass is greater than that of the first transparent embossed adhesive layer;

forming a grid-like first groove on the first transparent embossed adhesive layer, and filling a conductive material into the first groove and curing or solidifying the conductive material to form a first conductive layer embedded in the first transparent embossed adhesive layer, wherein the first conductive layer includes a plurality of first conductive strips extending along a first direction, and the first conductive strips each includes a plurality of conductive wires that are accommodated in the first groove and intercrossed with each other;

coating the embossed adhesive on the first transparent embossed adhesive layer, to form a second transparent embossed adhesive layer, where the refractive index of the first transparent embossed adhesive layer is not less than that of the second transparent embossed adhesive layer;

forming a grid-like second groove on the second transparent embossed adhesive layer, and filling a conductive material into the second groove and curing or solidifying the conductive material to form a second conductive layer embedded in the second transparent embossed adhesive layer, wherein the second conductive layer includes a plurality of second conductive strips extending along a second direction, and the second conductive strips each includes a plurality of conductive wires that are accommodated in the second groove and intercrossed with each other, and wherein the second direction is not parallel to the first direction, and the second conductive strips and the first conductive strips are spaced apart and insulated from each other in a thickness direction of the transparent cover glass; and forming a transmission reinforcement layer on the second transparent embossed adhesive layer, wherein the refractive index of the second transparent embossed adhesive layer is greater than that of the transmission reinforcement layer, and the refractive index of the transmission reinforcement layer is greater than that of air.

In an embodiment, the grid-like first groove is formed by the following steps:

providing a first imprint mold that includes a first imprint surface on which a grid-like first rib pattern is formed, pressing the first imprint surface on the first embossed adhesive layer and hardening the first embossed adhesive layer, then removing the first imprint mold; and the grid-like second groove is formed by the following steps:

providing a second imprint mold that includes a second imprint surface on which a grid-like second rib pattern is formed, pressing the second imprint surface on the second embossed adhesive layer and hardening the second embossed adhesive layer, then removing the second imprint mold.

In an embodiment, the first rib pattern and the second rib pattern each includes a plurality of intercrossing ribs, the ribs each has a width of 0.2 µm-5 µm and a thickness of 1 µm-10 µm, the intersection point of any two of the intercrossing ribs forms a node, and the distance between any two adjacent nodes is 50 µm-500 µm.

In an embodiment, the transmission reinforcement layer is formed by the following steps:

coating a heat curable resin or an ultraviolet curable resin onto the second transparent embossed adhesive layer and then curing or solidifying the resin to form the transmission reinforcement layer.

In an embodiment, the heat curable resin includes the following components based on 100 parts by mass:

50 parts to 80 parts of a polymer resin, 10 parts to 40 parts of a solvent, 0.1 parts to 5 parts of a leveling agent, 0.1 parts to 5 parts of a defoaming agent and 0.1 parts to 5 parts of a plasticizer;

wherein the polymer resin is at least one selected from the group consisting of polyester resin, polyurethane resin, acrylic ester, epoxy resin and vinyl ether;

the solvent is at least one selected from the group consisting of ethanol, n-butanol, ethylene glycol-butyl ether, butyl acetate, cyclohexanone, and glycidyl ether;

the leveling agent is at least one selected from the group consisting of polyacrylate, cellulose acetate butyrate, nitrocellulose and polyvinyl butyral;

the defoaming agent is at least one selected from the group consisting of phosphate defoaming agent, fatty acid ester defoaming agent and silicone defoaming agent; and the plasticizer is at least one selected from the group consisting of phthalic acid ester, diisononyl phthalate, diisodecyl phthalate and trimellitic acid ester.

In an embodiment, the ultraviolet curable resin includes the following components based on 100 parts by mass:

60 parts to 80 parts of an organic monomer, 10 parts to 30 parts of a diluent, 0.01 parts to 1 part of a photoinitiator, 0.2 parts to 2 parts of a stabilizer, 0.2 parts to 2 parts of a leveling agent, 0.3 parts to 2 parts of a defoaming agent and 0.5 parts to 3 parts of a plasticizer:

where the organic monomer is at least one selected from the group consisting of acrylic ester, epoxy resin and vinyl ether;

the diluent is at least one selected from the group consisting of tripropylene glycol diacrylate, trimethylolpropane triacrylate, ethoxylated trimethylolpropane triacrylate, dipentaerythritol hexaacrylate, 1,6-hexanediol methoxy monoacrylate and ethoxylated neopentyl glycol methoxy monoacrylate;

the photoinitiator is at least one selected from the group consisting of aromatic diazonium salt, aromatic sulfonium salt, aromatic iodonium salt and ferrocenium salt;

the stabilizer is at least one selected from the group consisting of hydroquinone, p-methoxyphenol, p-benzoquinone, 2,6-di-t-butyl methyl phenol, phenothiazine and anthraquinone;

the leveling agent is at least one selected from the group consisting of polyacrylate, cellulose acetate butyrate, nitrocellulose and polyvinyl butyral;

the defoaming agent is at least one selected from the group consisting of phosphate defoaming agent, fatty acid ester defoaming agent and silicone defoaming agent; and the plasticizer is at least one selected from the group consisting of phthalic acid ester, diisononyl phthalate, diisodecyl phthalate and trimellitic acid ester.

The double-layer touch screen of the present invention uses the first conductive layer and the second conductive layer formed by conductive materials filled into the first groove and the second groove to replace the ITO layer used in conventional touch screen. This type of double-layer touch screen can ensure light transmittance and conductivity and reduce cost due to the cheaper material, without additional etching technique.

DETAILED DESCRIPTION

In order to make the above objects, features and advantages of the present invention clearer, specific embodiments of the present invention will be described below with reference to the drawings. In the following description, specific details are set forth in order to fully understand the present invention. However, the present invention can be implemented in many ways other than those described below and a person skilled in the art can make similar improvements without departing from the conception of the present invention, the present invention is therefore not limited to the specific embodiments disclosed below.

Figure 1:
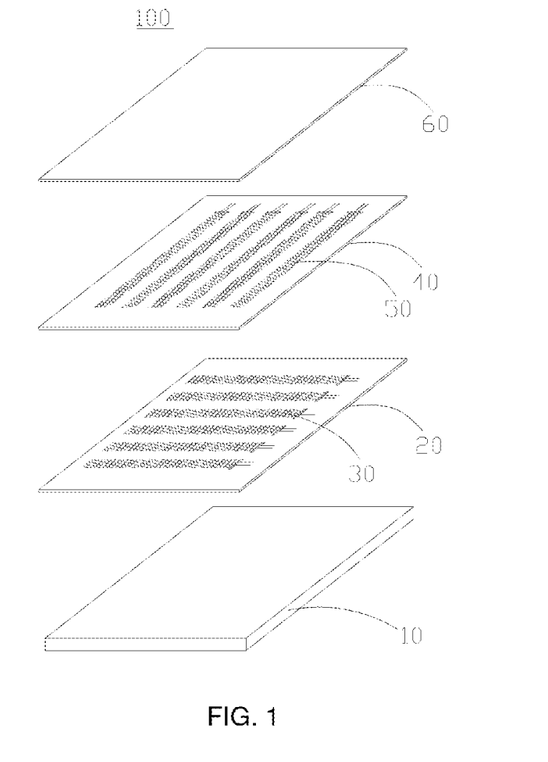
FIG. 1 is a schematic exploded view of a double-layer touch screen according to an embodiment of the present invention.

In an embodiment as shown in FIG. 1, a double-layer touch screen 100 includes: a transparent cover glass 10, a first transparent embossed adhesive layer 20, a first conductive layer 30, a second transparent embossed adhesive layer 40, a second conductive layer 50 and a transmission reinforcement layer 60.

The refractive index of the transparent cover glass 10 is larger than the refractive index of the first transparent embossed adhesive layer 20, the refractive index of first transparent embossed adhesive layer 20 is not less than the refractive index of the second transparent embossed adhesive layer 40, the refractive index of the second transparent embossed adhesive layer 40 is larger than the refractive index of the transmission reinforcement layer 60, and the refractive index of the transmission reinforcement layer 60 is larger than the refractive index of air.

The transparent cover glass 10 may be an aluminosilicate glass or a soda lime glass and may have a thickness of 0.3 mm-1.2 mm.

In this embodiment, Si—O groups on the surface of the transparent cover glass 10 facing the first transparent embossed adhesive layer 20 bond to the first transparent embossed adhesive layer 20.

The surface of the transparent cover glass 10 facing the first transparent embossed adhesive layer 20 has a roughness of 2 nm-8 nm.

In a preferred embodiment, the transparent cover glass 10 has a thickness of 0.5 mm-0.7 mm.

Figure 2:
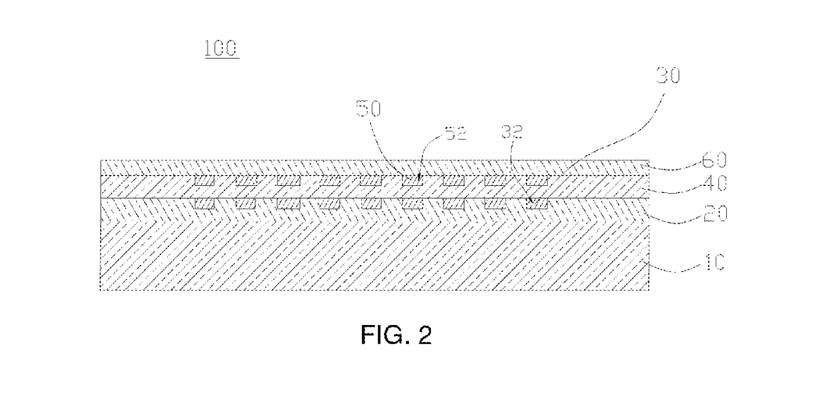
FIG. 2 is a cross-sectional view of the double-layer touch screen as shown in FIG. 1.
Figure 3A:
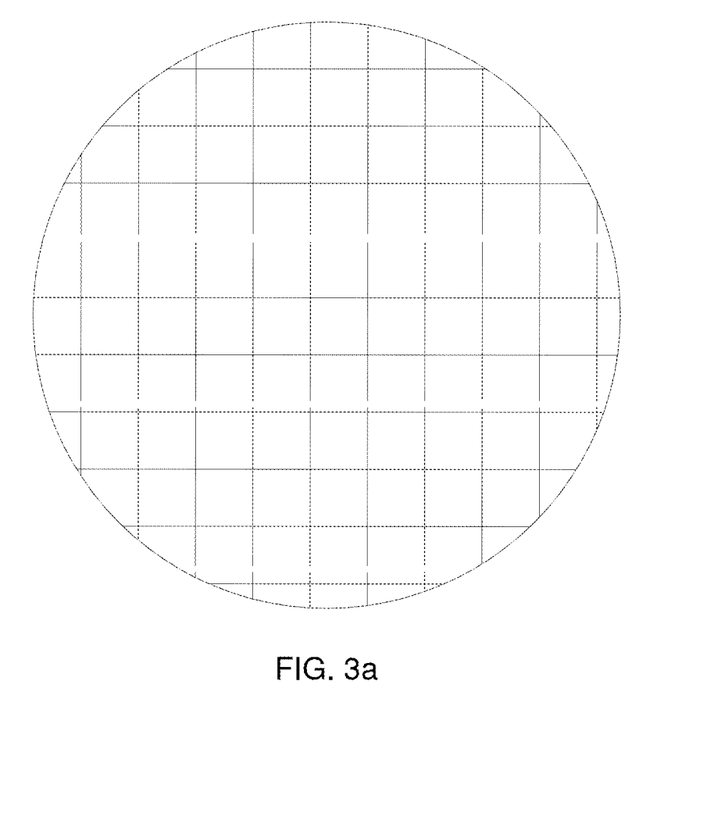
FIGS. 3a to 3d are schematic views of basic grids of conductive strips of the double-layer touch screen as shown in FIG. 1.
Figure 3B:
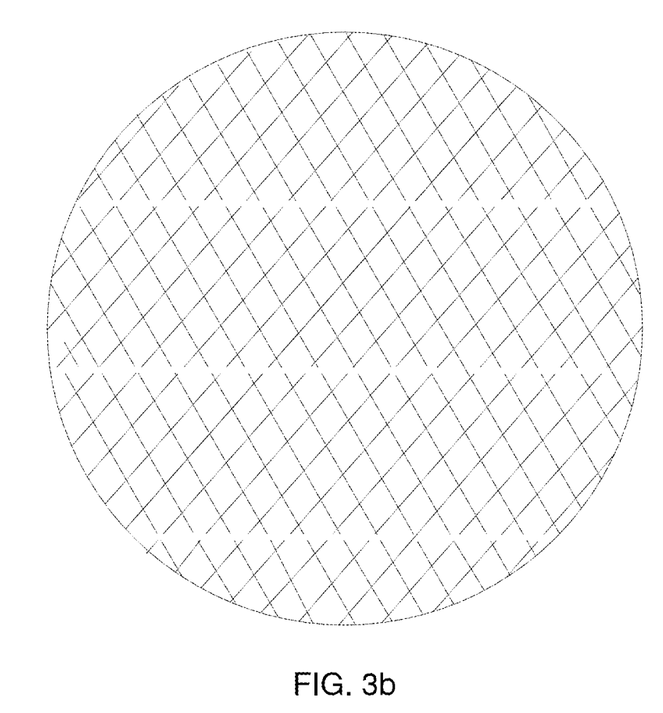
Figure 3C:
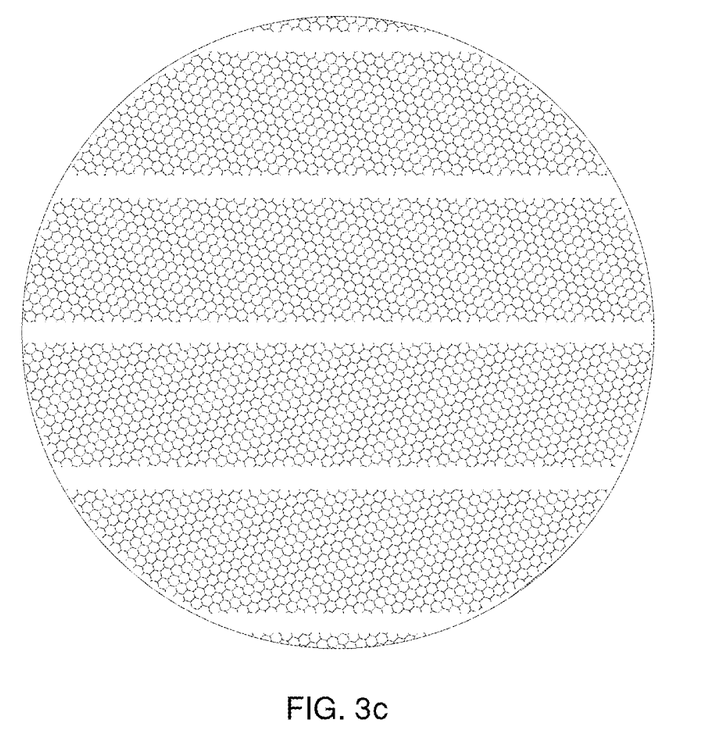
Figure 3D:
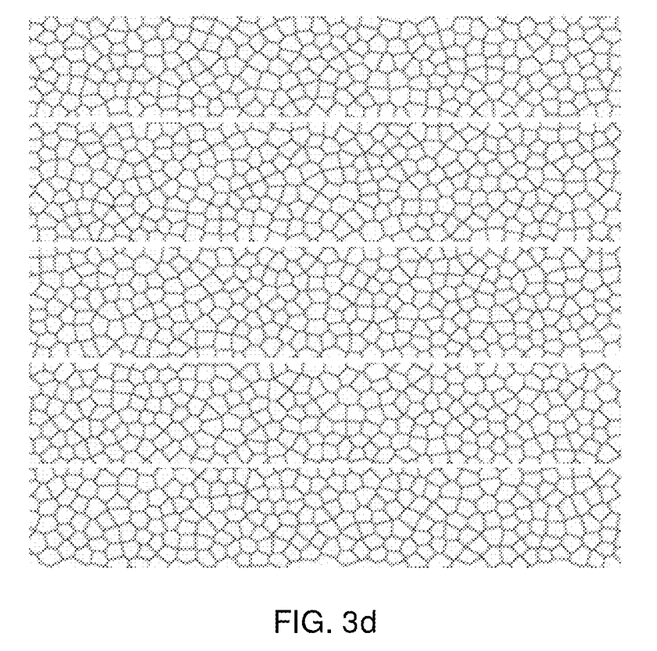

Referring to FIG. 2, the first transparent embossed adhesive layer 20 is laminated on one surface of the transparent cover glass 10 and defined a grid-like first groove 32 thereon, and the first conductive layer 30 is embedded in the first transparent embossed adhesive layer 20.

The second transparent embossed adhesive layer 40 is laminated on the first transparent embossed adhesive layer 20 and defined a grid-like second groove 52, and the second conductive layer 50 is embedded in the second transparent embossed adhesive layer 40.

The material of the first transparent embossed adhesive layer 20 may be a heat curable resin or an ultraviolet curable resin, and the material of the second transparent embossed adhesive layer 40 may be a heat curable resin or an ultraviolet curable resin.

The ultraviolet curable resin generally includes a prepolymer, a monomer, a photoinitiator and an additive, having a molar ratio of: 30-50%:40-60%:1-6%:0.2-1%, respectively. Where the prepolymer is selected from: epoxy acrylate, polyurethane acrylate, polyether acrylate, polyester acrylate, acrylic resin and the like; the monomer is selected from: monofunctional monomer, difunctional monomer, trifunctional monomer, and polyfunctional monomer; the photoinitiator is selected from: benzophenone, acetophenone and the like; the additive may or may not be added, and generally is used as an adhesive agent, the commonly used additives including: hydroquinone, p-methoxyphenol, p-benzoquinone, 2,6-di-t-butyl methyl phenol and the like.

The first transparent embossed adhesive layer 20 may have a thickness of 1 µm-10 µm and the second transparent embossed adhesive layer 40 may have a thickness of 1 µm-10 µm.

In a preferred embodiment, the first transparent embossed adhesive layer 20 has a thickness of 2 µm-5 µm.

In a preferred embodiment, the second transparent embossed adhesive layer 40 has a thickness of 2 µm-5 µm.

The first conductive layer 30 includes a plurality of first conductive strips extending along a first direction, where the first conductive strips each is formed by intercrossing conductive wires that are formed by curing or solidifying a conductive material filled in the first groove 32.

The second conductive layer 50 includes a plurality of second conductive strips extending along a second direction, where the second conductive strips each is formed by intercrossing conductive wires that are formed by curing or solidifying a conductive material filled in the second groove 52.

Referring to FIG. 1, the first direction is not parallel to the second direction, and the first conductive strips and the second conductive strips are spaced apart and insulated from each other in a thickness direction of the transparent cover glass 10.

The conductive material may be metal, carbon nanotube, graphene, conductive polymer or indium tin oxide.

The metal may be at least one selected from the group consisting of gold, silver, copper, aluminum, nickel, and zinc.

The conductive wires each may have a width of 0.2 µm-5 µm and a thickness of 1 µm-10 µm, where the intersection point of any two intercrossing conductive wires forms a node, and the distance between any two adjacent nodes may be 50 µm-500 µm.

In a preferred embodiment, the conductive wires each has a width of 0.5 µm-2 µm and a thickness of 2 µm-5 µm.

FIGS. 3a to 3d are schematic views of basic grids of conductive strips of the double-layer touch screen in this embodiment. It can be seen from FIGS. 3a to 3d that the basic grids constituting the conductive strips may form a regular polygon, such as square, rhombus, regular hexagon, etc., or a random grid pattern. The first conductive layer 30 and the second conductive layer 50 correspond to a first axial conductive unit and a second axial conductive unit, respectively. The first axial conductive unit and the second axial conductive unit are separated to form a first axial conductive pattern and a second axial conductive pattern that are insulated from each other.

The material of the transmission reinforcement layer 60 may be a heat curable resin or an ultraviolet curable resin, and the thickness of the transmission reinforcement layer 60 is 0.5 µm-5 µm.

In a preferred embodiment, the transmission reinforcement layer 60 has a thickness of 1 µm-2 µm.

In this embodiment, the heat curable resin includes the following components based on 100 parts by mass: 50 parts to 80 parts of a polymer resin, 10 parts to 40 parts of a solvent, 0.1 parts to 5 parts of a leveling agent, 0.1 parts to 5 parts of a defoaming agent and 0.1 parts to 5 parts of a plasticizer.

The polymer resin may be at least one selected from the group consisting of polyester resin, polyurethane resin, acrylic ester, epoxy resin and vinyl ether.

The solvent may be at least one selected from the group consisting of ethanol, n-butanol, ethylene glycol-butyl ether, butyl acetate, cyclohexanone, and glycidyl ether.

The leveling agent is used to improve the leveling performance of the resin and prevent the coating layer from forming defects such as shrinkage and pinholes, so that the coating layer can remain level and has improved gloss. The leveling agent may be at least one selected from the group consisting of polyacrylate, cellulose acetate butyrate, nitrocellulose and polyvinyl butyral.

The defoaming agent is used to prevent and eliminate air bubbles generated during manufacture and use of a coating material, and thus can prevent the coating layer from forming pinholes. The defoaming agent may be at least one selected from the group consisting of phosphate defoaming agent, fatty acid ester defoaming agent and silicone defoaming agent. In an embodiment, the defoaming agent may be at least one selected from the group consisting of tributyl phosphate defoaming agent, propylene glycol fatty acid ester defoaming agent and polymethylsiloxane defoaming agent.

The plasticizer is used to weaken intermolecular forces of polymer molecules, so as to enhance flexibility of the adhesive and relax internal stress of adhesive, thereby increasing impact strength of the adhesive. The plasticizer may be at least one selected from the group consisting of phthalic acid ester, diisononyl phthalate, diisodecyl phthalate and trimellitic acid ester.

The heat curable resin has a heat curing temperature of 100° C.-180° C., curing time of 5 min-30 min at the heat curing temperature, and a viscosity of 500 cps-5000 cps.

The ultraviolet curable resin includes the following components based on 100 parts by mass: 60 parts to 80 parts of an organic monomer, 10 parts to 30 parts of a diluent, 0.01 parts to 1 part of a photoinitiator, 0.2 parts to 2 parts of a stabilizer, 0.2 parts to 2 parts of a leveling agent, 0.3 part to 2 parts of a defoaming agent, and 0.5 parts to 3 parts of a plasticizer.

The organic monomer may be a material with a low viscosity, such as acrylic ester, epoxy resin and vinyl ether, in order to provide better flowability.

The diluent has a dilution effect on the adhesive solution to render the adhesive solution a reduced viscosity, making it easy to use in the process, and also the diluent can facilitate crosslinking of the adhesive. The diluent thus may play a role in improving the viscosity, adhesion, flexibility, hardness and curing speed. The diluent may be at least one selected from the group consisting of tripropylene glycol diacrylate, trimethylolpropane triacrylate, ethoxylated trimethylolpropane triacrylate, dipentaerythritol hexaacrylate, 1,6-hexanediol methoxy monoacrylate and ethoxylated neopentyl glycol methoxy monoacrylate.

The photoinitiator is used to generate radicals or ions by decomposition after the adhesive absorbs ultraviolet light, and the radicals or ions then initiate the polymerization and crosslinking of the organic monomer to form a network structure, so as to act as an achieve material. The photoinitiator may be at least one selected from the group consisting of aromatic diazonium salt, aromatic sulfonium salt, aromatic iodonium salt and ferrocenium salt.

The stabilizer may reduce the chance of polymerization during storage and increase the storage stability of the resin. The stabilizer may be at least one selected from the group consisting of hydroquinone, p-methoxyphenol, p-benzoquinone, 2,6-di-t-butyl methyl phenol, phenothiazine and anthraquinone.

The ultraviolet curable resin has a curing wavelength of less than 400 nm and a viscosity of 500 cps-5000 cps.

Figure 4:
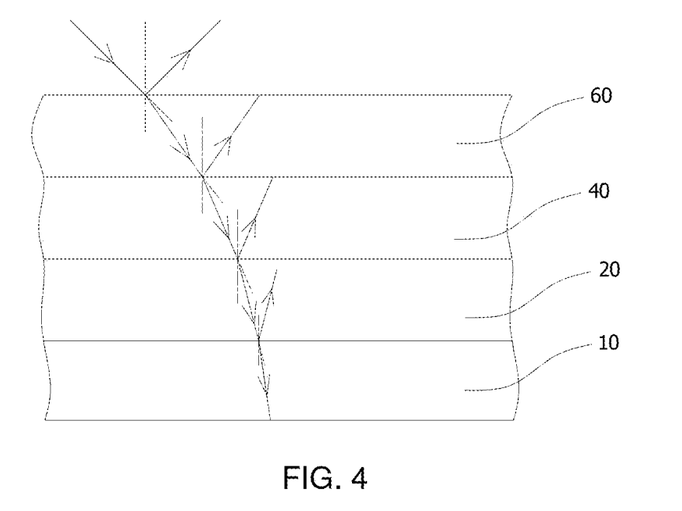
FIG. 4 is a schematic view showing the refraction of an incident light from the transmission reinforcement layer side of the double-layer touch screen as shown in FIG. 1.

To reduce surface reflection of light on the double-layer touch screen, the transparent cover glass 10, the first transparent embossed adhesive layer 20, the second transparent embossed adhesive layer 40 and the transmission reinforcement layer 60 are stacked orderly according to their refractive indexes. Referring to FIG. 4, the light is incident from air into the transmission reinforcement layer 60, and then into the second transparent embossed adhesive layer 40, the first transparent embossed adhesive layer 20 and the transparent cover glass 10 in sequence. If the refractive index of the air is $n_1=1.0$; the refractive index of the transparent cover glass 10 is $n_5=1.52$, the refractive index of the first transparent embossed adhesive layer 20 is $n_4$, the refractive index of the second transparent embossed adhesive layer 40 is $n_3$, the refractive index of the transmission reinforcement layer 60 is $n_2$, then $n_1$, $n_2$, $n_3$, $n_4$ and $n_5$ should meet the following conditions: $n_1<n_2<n_3 \leq n_4<n_5$, so as to reduce the light reflection loss。 $n_3=n_4$ indicates the first transparent embossed adhesive layer 20 and the second transparent embossed adhesive layer 40 are formed by the same material; otherwise, $n_3$ should be less than $n_4$.

The first transparent embossed adhesive layer 20, the second transparent embossed adhesive layer 40 and the transmission reinforcement layer 60 each should have a refractive index of less than 1.52, where the refractive index of the second transparent embossed adhesive layer 40 should not be greater than that of the first transparent embossed adhesive layer 20 and the refractive index of the transmission reinforcement layer 60 should be less than that of the second transparent embossed adhesive layer 40.

In this embodiment, the material of the first transparent embossed adhesive layer 20 can be PMMA ultraviolet adhesive (refractive index of which is $n_4=1.49$ after curing), the material of the second transparent embossed adhesive layer 40 can be polyvinyl isobutyl ether ultraviolet adhesive (refractive index of which is $n_3=1.44$ after curing), and the material of the transmission reinforcement layer 60 can be heat curable polytetrafluoroethylene (refractive index of which is $n_2=1.35$ after curing). In another embodiment, the second transparent embossed adhesive layer 40 also may have the same material as the first transparent embossed adhesive layer, i.e., PMMA ultraviolet adhesive, while the materials of the other layers remain unchanged.

The double-layer touch screen of the present invention uses the first conductive layer 30 and the second conductive layer 50 formed by conductive materials filled into the first groove 32 and the second groove 52 to replace ITO layer used in conventional touch screen. This type of double-layer touch screen can ensure light transmittance and conductivity and reduce cost due to the cheaper material used, without additional etching technique.

In this embodiment, the material of both the first conductive layer 30 and the second conductive layer 50 is silver, so as to further ensure conductivity of the conductive unit.

The transparent cover glass 10, the first transparent embossed adhesive layer 20, the second transparent embossed adhesive layer 40 and the transmission reinforcement layer 60 are stacked orderly according to their refractive indexes, to obtain a double-layer touch screen 100 that has higher transmissivity than the conventional double-layer touch screen.

Furthermore, such double-layer touch screen 100 using the first conductive layer 30 and the second conductive layer 50 thus can solve problems such as slow response caused by ITO within the conventional large touch panel. Meanwhile, because the first conductive layer 30 and the second conductive layer 50 are embedded in the first transparent embossed adhesive layer 20 and the second transparent embossed adhesive layer 40, respectively, and thus can prevent the first conductive layer 30 and the second conductive layer 50 from being scratched.

The double-layer touch screen 100, due to the use of the first conductive layer 30 and the second conductive layer 50, does not require bypass structure, and thus can be made by a simple process, and it is beneficial to improve efficiency and yield.

The transmission reinforcement layer 60 coated on the second conductive layer 50 can protect the second conductive layer 50 from being scratched.

As shown in FIGS. 5 and 6a-6h, a method for making a double-layer touch screen 100 includes the steps as described below.

Figure 5:
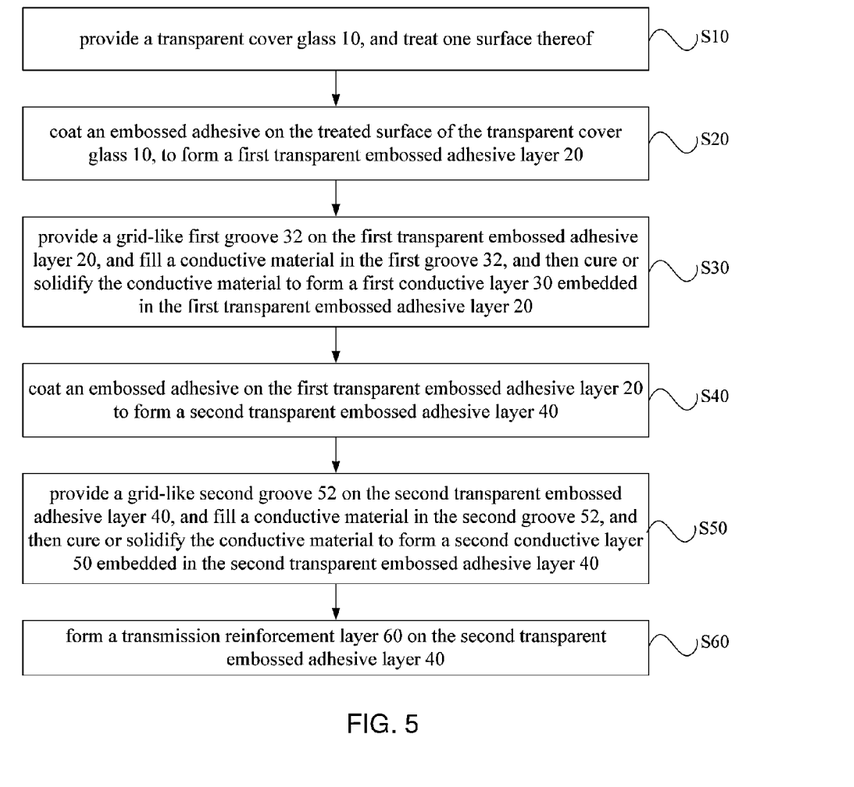
FIG. 5 is a flow chart of a method for making the double-layer touch screen as shown in FIG. 1.

S10, provide a transparent cover glass 10, and treat one surface thereof.

Figure 6:
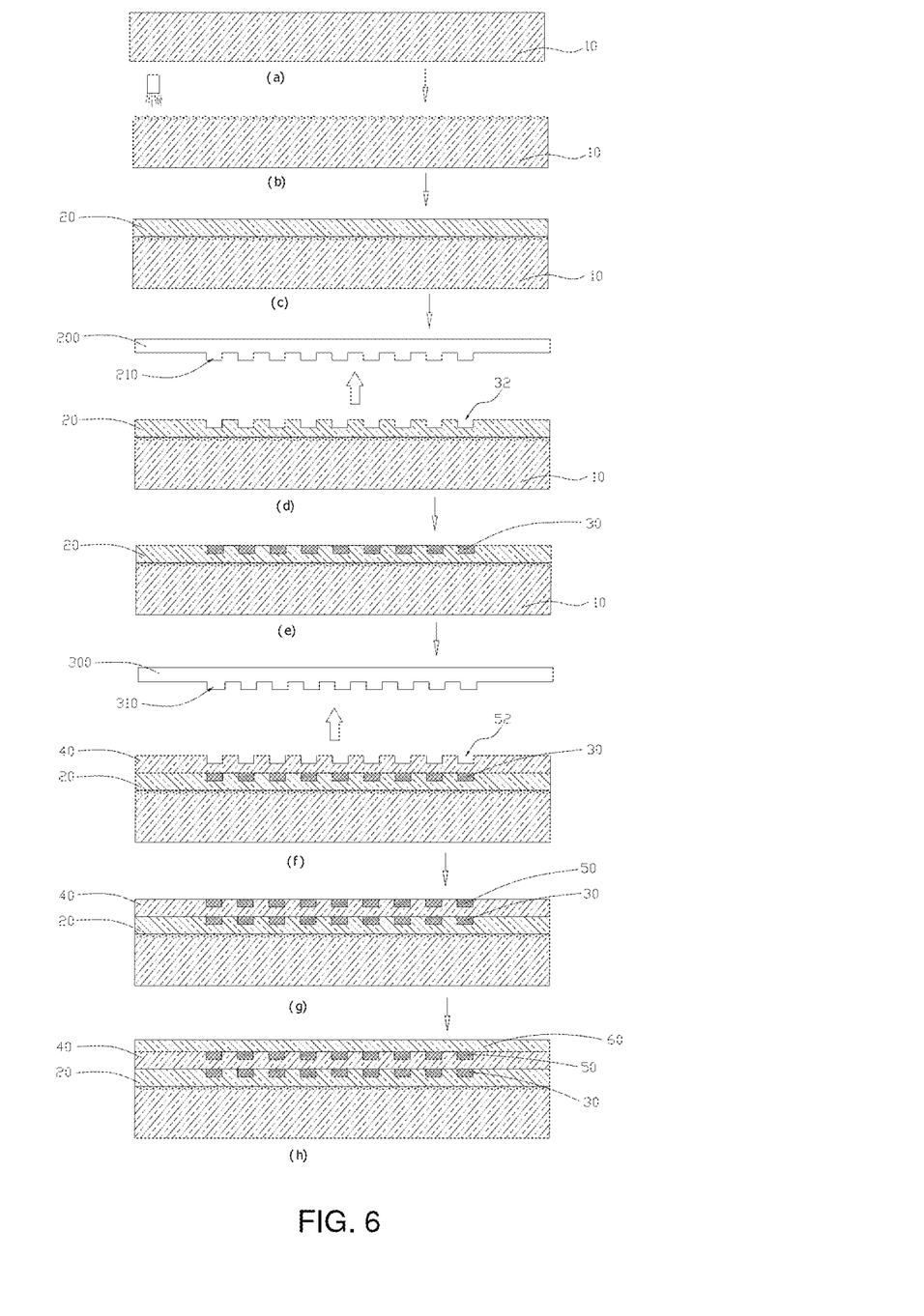
FIGS. 6a to 6h are schematic views of various stages in the process of making the double-layer touch screen as shown in FIG. 1

A transparent cover glass 10 as shown in FIG. 6a is provided, and then one surface thereof is treated to get the transparent cover glass 10 as shown in FIG. 6b.

The above surface treatment is conducted specifically as follows: use a plasma cleaner to clean and roughen one surface of the transparent cover glass 10, so that the surface of the transparent cover glass 10 has a roughness of 2 nm-8 nm and Si—O groups on this surface are exposed, to increase adhesion of the transparent cover glass 10.

The transparent cover glass 10 may be an aluminosilicate glass or a soda lime glass, and has a thickness of 0.3 mm-1.2 mm.

In a preferred embodiment, the transparent cover glass 10 has a thickness of 0.5 mm-0.7 mm.

In this embodiment, the transparent glass plate 10 is aluminosilicate reinforced glass with a thickness of 0.7 mm.

S20, coat an embossed adhesive on the treated surface of the transparent cover glass 10, to form a first transparent embossed adhesive layer 20.

The treated surface of the transparent cover glass 10 is coated with an embossed adhesive, to obtain the transparent cover glass 10 coated with a first transparent embossed adhesive layer 20, as shown in FIG. 6c.

The refractive index of the transparent cover glass 10 is larger than that of the first transparent embossed adhesive layer 20. The adhesive may be a heat curable resin or an ultraviolet curable resin.

The ultraviolet curable resin generally includes a prepolymer, a monomer, a photoinitiator and an additive, having a molar ratio of: 30-50%:40-60%:1-6%:0.2-1%, respectively. Where the prepolymer is selected from: epoxy acrylate, polyurethane acrylate, polyether acrylates, polyester acrylate, acrylic resin and the like; the monomer is selected from: monofunctional monomer, difunctional monomer, trifunctional monomer, and polyfunctional monomer; the photoinitiator is selected from: benzophenone, acetophenone and the like; the additive may or may not be added, and generally is used as an adhesive agent, the commonly used additives includes: hydroquinone, p-methoxyphenol, p-benzoquinone, 2,6-di-t-butyl methyl phenol and the like.

The first transparent embossed adhesive layer 20 has a thickness of 1 μm-10 μm.

In a preferred embodiment, first transparent embossed adhesive layer 20 has a thickness of 2 μm-5 μm.

In this embodiment, the treated surface of the transparent cover glass 10 is coated with a PMMA ultraviolet adhesive with thickness of 5 μm, so as to form the first transparent embossed adhesive layer 20.

S30, provide a grid-like first groove 32 on the first transparent embossed adhesive layer 20, and fill a conductive material in the first groove 32, and then cure or solidify the conductive material to form a first conductive layer 30 embedded in the first transparent embossed adhesive layer 20.

The first conductive layer 30 includes a plurality of first conductive strips extending along a first direction, where the first conductive strip is formed by intercrossing conductive wires that are formed by curing or solidifying conductive material filled in the first groove.

Referring to FIGS. 6d and 6e, the grid-like first groove 32 is formed by the following steps: provide a first imprint mold 200 that includes a first imprint surface on which a grid-like first rib pattern 210 is formed, press the first imprint surface on the first embossed adhesive layer 20 and harden the first embossed adhesive layer 20, then remove the first imprint mold 200.

Where the thickness of the first conductive layer 30 is not greater than the depth of the first groove 32.

The first rib pattern 210 includes a plurality of intercrossing ribs, the ribs each has a width of 0.2 μm-5 μm and a thickness of 1 μm-10 μm, the intersection point of any two of the intercrossing ribs forms a node, and the distance between any two adjacent nodes is 50 μm-500 μm.

The conductive material may be at least one selected from the group consisting of metal, carbon nanotube, graphene, conductive polymer or indium tin oxide.

The metal is at least one selected from the group consisting of gold, silver, copper, aluminum, nickel, and zinc.

S40, coat an embossed adhesive on the first transparent embossed adhesive layer 20 to form a second transparent embossed adhesive layer 40.

The refractive index of the first transparent embossed adhesive layer 20 is not less than that of the second transparent embossed adhesive layer 40.

The second transparent embossed adhesive layer 40 has a thickness of 1 μm-10 μm.

In a preferred embodiment, the second transparent embossed adhesive layer 40 has a thickness of 2 μm-5 μm.

In this embodiment, the surface of the first transparent embossed adhesive layer 20 is coated with polyvinyl isobutyl ether ultraviolet adhesive with a thickness of 5 μm, so as to form the second transparent embossed adhesive layer 40.

The specific component of the embossed adhesive is described as above.

S50, provide a grid-like second groove 52 on the second transparent embossed adhesive layer 40, and fill a conductive material in the second groove 52, and then cure or solidify the conductive material to form a second conductive layer 50 embedded in the second transparent embossed adhesive layer 40.

The second conductive layer 50 includes a plurality of second conductive strips extending along a second direction, where the second conductive strip is formed by intercrossing conductive wires that are formed by curing or solidifying of a conductive material filled in the second groove 52.

Referring to FIG. 1, the first direction is not parallel to the second direction, and the first conductive strip and the second conductive strip are spaced apart and insulated from each other in a thickness direction of the transparent cover glass 10.

Referring to FIGS. 6f and 6g, in step S50, the grid-like second groove 52 is formed by the following steps:

Provide a second imprint mold 300 that includes a second imprint surface on which a grid-like second rib pattern 310 is formed, press the second imprint surface on the second embossed adhesive layer 40 and harden the second embossed adhesive layer 40, then remove the second imprint mold 300.

Where the thickness of the second conductive layer 50 is not greater than the depth of the second groove 52.

The second rib pattern 310 includes a plurality of intercrossing ribs, the ribs each has a width of 0.2 μm-5 μm and a thickness of 1 μm-10 μm, the intersection point of any two of the intercrossing ribs forms a node, and the distance between any two adjacent nodes is 50 μm-500 μm.

The conductive material may be metal, carbon nanotube, graphene, conductive polymer or indium tin oxide.

The metal is at least one selected from the group consisting of gold, silver, copper, aluminum, nickel, and zinc.

FIGS. 3a to 3d show basic grids of conductive strips of the double-layer touch screen according to this embodiment. It can be seen from FIGS. 3a to 3d that the basic grids constituting the conductive strips may form a regular polygon, such as square, rhombus, regular hexagon, etc., or a random grid pattern. The first conductive layer 30 and the second conductive layer 50 correspond to a first axial conductive unit and a second axial conductive unit, respectively. The first axial conductive unit and the second axial conductive unit are separated to form a first axial conductive pattern and a second axial conductive pattern that are insulated from each other.

S60, form a transmission reinforcement layer 60 on the second transparent embossed adhesive layer 40.

Referring to FIG. 6h, a heat curable resin or an ultraviolet curable resin is coated on the second transparent embossed adhesive layer 40, and then is cured to form a transmission reinforcement layer 60.

The refractive index of the second transparent embossed adhesive layer 40 is greater than that of the transmission reinforcement layer 60, and the refractive index of the transmission reinforcement layer 60 is greater than that of air.

The material of the transmission reinforcement layer 60 can be a heat curable resin or an ultraviolet curable resin and the transmission reinforcement layer has a thickness of 0.5 μm-5 μm.

In a preferred embodiment, the transmission reinforcement layer 60 has a thickness of 1 μm-2 μm.

In this embodiment, the heat curable resin includes the following components based on 100 parts by mass: 50 parts to 80 parts of a polymer resin, 10 parts to 40 parts of a solvent, 0.1 parts to 5 parts of a leveling agent, 0.1 parts to 5 parts of a defoaming agent and 0.1 parts to 5 parts of a plasticizer.

The polymer resin may be at least one selected from the group consisting of polyester resin, polyurethane resin, acrylic ester, epoxy resin and vinyl ether;

The solvent may be at least one selected from the group consisting of ethanol, n-butanol, ethylene glycol-butyl ether, butyl acetate, cyclohexanone and glycidyl ether.

The leveling agent is used to improve the leveling performance of the resin and prevent the coating layer from forming defects such as shrinkage and pinholes, so that the coating layer can remain level and has improved gloss. The leveling agent may be at least one selected from the group consisting of polyacrylate, cellulose acetate butyrate, nitrocellulose and polyvinyl butyral.

The defoaming agent is used to prevent and eliminate air bubbles generated during manufacture and use of a coating material, and thus can prevent the coating layer from forming pinholes. The defoaming agent may be at least one selected from the group consisting of phosphate defoaming agent, fatty acid ester defoaming agent and silicone defoaming agent. In one embodiment, the defoaming agent may be at least one selected from the group consisting of tributyl phosphate defoaming agent, propylene glycol fatty acid ester defoaming agent and polymethylsiloxane defoaming agent.

The plasticizer is used to weaken intermolecular forces of polymer molecules, so as to enhance flexibility of the adhesive and relax internal stress of the adhesive, thereby increasing impact strength of the adhesive. The plasticizer may be at least one selected from the group consisting of phthalic acid ester, diisononyl phthalate, diisodecyl phthalate and trimellitic acid ester.

Such heat curable resin has a heat curing temperature of 100° C.-180° C., curing time of 5 min-30 min at the heat curing temperature, and a viscosity of 500 cps-5000 cps.

The ultraviolet curable resin includes the following components based on 100 parts by mass: 60 parts to 80 parts of an organic monomer, 10 parts to 30 parts of a diluent, 0.01 parts to 1 part of a photoinitiator, 0.2 parts to 2 parts of a stabilizer, 0.2 parts to 2 parts of a leveling agent, 0.3 part to 2 parts of a defoaming agent, and 0.5 parts to 3 parts of a plasticizer.

The organic monomer may be materials with a low viscosity, such as acrylic ester, epoxy resin and vinyl ether, in order to provide better flowability.

On one hand, the diluent has a dilution effect on the adhesive solution to render the adhesive solution a reduced viscosity, making it easy to use in the process, and on the other hand, the diluent can facilitate crosslinking of the adhesive. The diluent thus may play a role in improving the viscosity, adhesion, flexibility, hardness and curing speed. The diluent may be at least one selected from the group consisting of tripropylene glycol diacrylate, trimethylolpropane triacrylate, ethoxylated trimethylolpropane triacrylate, dipentaerythritol hexaacrylate, 1,6-hexanediol methoxy monoacrylate and ethoxylated neopentyl glycol methoxy monoacrylate.

The photoinitiator is used to generate radicals or ions by decomposition after the adhesive absorbs ultraviolet light, and the radicals or ions then initiate the polymerization and crosslinking of the organic monomer to form a network structure, so as to act as an achieve material. The photoinitiator may be at least one selected from the group consisting of aromatic diazonium salt, aromatic sulfonium salt, aromatic iodonium salt and ferrocenium salt.

The stabilizer may reduce the chance of polymerization during storage and increase the storage stability of the resin. The stabilizer may be at least one selected from the group consisting of hydroquinone, p-methoxyphenol, p-benzoquinone, 2,6-di-t-butyl methyl phenol, phenothiazine and anthraquinone.

The ultraviolet curable resin has a curing wavelength of less than 400 nm and a viscosity of 500 cps-5000 cps.

To reduce surface reflection of light on the double-layer touch screen, the transparent cover glass 10, the first transparent embossed adhesive layer 20, the second transparent embossed adhesive layer 40 and the transmission reinforcement layer 60 are stacked orderly according to their refractive indexes. Referring to FIG. 4, the light is incident from air into the transmission reinforcement layer 60, and then into the second transparent embossed adhesive layer 40, the first transparent embossed adhesive layer 20 and the transparent cover glass 10 in sequence. If the refractive index of the air is $n_1=1.0$; the refractive index of the transparent cover glass 10 is $n_5=1.52$, the refractive index of the first transparent embossed adhesive layer 20 is $n_4$, the refractive index of the second transparent embossed adhesive layer 40 is $n_3$, the refractive index of the transmission reinforcement layer 60 is $n_2$, then $n_1$, $n_2$, $n_3$, $n_4$ and $n_5$ should meet the following conditions: $n_1<n_2<n_3 \leq n_4<n_5$, so as to reduce the light reflection loss. $n_3=n_4$ indicates the first transparent embossed adhesive layer 20 and the second transparent embossed adhesive layer 40 are formed by the same material; otherwise, $n_3$ should be less than $n_4$.

The first transparent embossed adhesive layer 20, the second transparent embossed adhesive layer 40 and the transmission reinforcement layer 60 each should have a refractive index of less than 1.52, wherein the refractive index of the second transparent embossed adhesive layer 40 should not be greater than that of the first transparent embossed adhesive layer 20 and the refractive index of the transmission reinforcement layer 60 should be less than that of the second transparent embossed adhesive layer 40.

In this embodiment, the material of the first transparent embossed adhesive layer 20 can be PMMA ultraviolet adhesive (refractive index of which is $n_4=1.49$ after curing), the material of the second transparent embossed adhesive layer 40 can be polyvinyl isobutyl ether ultraviolet adhesive (refractive index of which is $n_3=1.44$ after curing), and the material of the transmission reinforcement layer 60 can be heat curable polytetrafluoroethylene (refractive index of which is $n_2=1.35$ after curing). In another embodiment, the second transparent embossed adhesive layer 40 also may have the same material as the first transparent embossed adhesive layer, i.e., PMMA ultraviolet adhesive, while the materials of the other layers remain unchanged.

The double-layer touch screen of the present invention uses the first conductive layer 30 and the second conductive layer 50 formed by conductive materials filled into the first groove 32 and the second groove 52 to replace ITO layer used in conventional touch screen. This type of double-layer touch screen can ensure light transmittance and conductivity and reduce cost due to the cheaper material, without additional etching technique.

In this embodiment, the material of both the first conductive layer 30 and the second conductive layer 50 is silver, to further ensure conductivity of the conductive unit.

The transparent cover glass 10, the first transparent embossed adhesive layer 20, the second transparent embossed adhesive layer 40 and the transmission reinforcement layer 60 are stacked orderly according to their refractive indexes, to obtain a double-layer touch screen 100 that has higher transmissivity than the conventional double-layer touch screen.

Furthermore, such double-layer touch screen 100 using the first conductive layer 30 and the second conductive layer 50 thus can solve problems such as slow response caused by ITO within the conventional large touch panel. Meanwhile, the first conductive layer 30 and the second conductive layer 50 are embedded in the first transparent embossed adhesive layer 20 and the second transparent embossed adhesive layer 40, respectively, and thus can prevent the first conductive layer 30 and the second conductive layer 50 from being scratched.

The double-layer touch screen 100, due to the use of the first conductive layer 30 and the second conductive layer 50, does not require bypass structure, and thus can be made by a simple process, and it is beneficial to improve efficiency and yield.

The transmission reinforcement layer 60 coated on the second conductive layer 50 can protect the second conductive layer 50 from being scratched.

The above embodiments merely describe several implementing modes of the present invention with specific details, but are not be explained as limiting the scope of the present invention. It should be recognized that various modifications

What is claimed is:

1. A double-layer touch screen, comprising:
a transparent cover glass;
a first transparent embossed adhesive layer laminated on one surface of the transparent cover glass and defining a grid-like first groove thereon, wherein the refractive index of the transparent cover glass is greater than that of the first transparent embossed adhesive layer;
a first conductive layer embedded in the first transparent embossed adhesive layer and including a plurality of first conductive strips extending along a first direction, wherein the first conductive strips each is formed by intercrossing conductive wires that are formed by curing or solidifying a conductive material filled in the first groove;
a second transparent embossed adhesive layer laminated on the first transparent embossed adhesive layer and defining a grid-like second groove thereon, wherein the refractive index of the first transparent embossed adhesive layer is not less than that of the second transparent embossed adhesive layer;
a second conductive layer embedded in the second transparent embossed adhesive layer and including a plurality of second conductive strips extending along a second direction, wherein the second conductive strips each is formed by intercrossing conductive wires that are formed by curing or solidifying a conductive material filled in the second groove; and
a transmission reinforcement layer covering on the second transparent embossed adhesive layer, wherein the refractive index of the second transparent embossed adhesive layer is greater than that of the transmission reinforcement layer, and the refractive index of the transmission reinforcement layer is greater than that of air;
wherein the first direction is not parallel to the second direction, and the first conductive strips and the second conductive strips are spaced apart and insulated from each other in a thickness direction of the transparent cover glass;
wherein material of the transmission reinforcement layer is formed by a heat curable resin, and the transmission reinforcement layer has a thickness of 0.5 µm-5 µm;
wherein the heat curable resin comprises the following components based on 100 parts by mass:
50 parts to 80 parts of a polymer resin, 10 parts to 40 parts of a solvent, 0.1 parts to 5 parts of a leveling agent, 0.1 parts to 5 parts of a defoaming agent and 0.1 parts to 5 parts of a plasticizer;
wherein the polymer resin is at least one selected from the group consisting of a polyester resin, a polyurethane resin, an acrylic ester, an epoxy resin and a vinyl ether;
the solvent is at least one selected from the group consisting of ethanol, n-butanol, ethylene glycol-butyl ether, butyl acetate, cyclohexanone, and glycidyl ether;
the leveling agent is at least one selected from the group consisting of polyacrylate, cellulose acetate butyrate, nitrocellulose and polyvinyl butyral;
the defoaming agent is at least one selected from the group consisting of phosphate defoaming agent, fatty acid ester defoaming agent and silicone defoaming agent; and
the plasticizer is at least one selected from the group consisting of phthalic acid ester, diisononyl phthalate, diisodecyl phthalate and trimellitic acid ester.

2. The double-layer touch screen according to claim 1, wherein material of the first conductive layer is metal or alloy thereof, carbon nanotube, graphene, organic conductive polymer, or ITO; and
material of the second conductive layer is metal or alloy thereof, carbon nanotube, graphene, organic conductive polymer, or ITO.

3. The double-layer touch screen according to claim 2, wherein the metal is at least one selected from the group consisting of gold, silver, copper, aluminum, nickel, and zinc.

4. The double-layer touch screen according to claim 1, wherein the conductive wires of the first and second transparent embossed adhesive layers each has a width of 0.2 µm-5 µm and a thickness of 1 µm-10 µm, an intersection point of any two intercrossing conductive wires forms a node, and the distance between any two adjacent nodes is 50 µm-500 µm.

5. The double-layer touch screen according to claim 1, wherein material of the first transparent embossed adhesive layer and the second transparent embossed adhesive layer is a heat curable resin or an ultraviolet curable resin; and
the first transparent embossed adhesive layer has a thickness of 1 µm-10 µm, and the second transparent embossed adhesive layer has a thickness of 1 µm-10 µm.

6. The double-layer touch screen according to claim 1, wherein the transparent cover glass is an aluminosilicate glass or a soda lime glass and has a thickness of 0.3 mm-1.2 mm, and Si—O groups on said one surface of the transparent cover glass bond to the first transparent embossed adhesive layer.

7. The double-layer touch screen according to claim 1, wherein said one surface of the transparent cover glass has a roughness of 2 nm-8 nm.

8. The double-layer touch screen according to claim 1, wherein the first conductive layer is separated from the transparent cover glass by the first transparent adhesive layer.

9. A double-layer touch screen, comprising:
a transparent cover glass;
a first transparent embossed adhesive layer laminated on one surface of the transparent cover glass and defining a grid-like first groove thereon, wherein the refractive index of the transparent cover glass is greater than that of the first transparent embossed adhesive layer;
a first conductive layer embedded in the first transparent embossed adhesive layer and including a plurality of first conductive strips extending along a first direction, wherein the first conductive strips each is formed by intercrossing conductive wires that are formed by curing or solidifying a conductive material filled in the first groove;
a second transparent embossed adhesive layer laminated on the first transparent embossed adhesive layer and defining a grid-like second groove thereon, wherein the refractive index of the first transparent embossed adhesive layer is not less than that of the second transparent embossed adhesive layer;
a second conductive layer embedded in the second transparent embossed adhesive layer and including a plurality of second conductive strips extending along a second direction, wherein the second conductive strips each is formed by intercrossing conductive wires that are formed by curing or solidifying a conductive material filled in the second groove; and a transmission reinforcement layer covering on the second transparent embossed adhesive layer, wherein the refractive index of the second transparent embossed adhesive layer is greater than that of the transmission reinforcement layer, and the refractive index of the transmission reinforcement layer is greater than that of air;

wherein the first direction is not parallel to the second direction, and the first conductive strips and the second conductive strips are spaced apart and insulated from each other in a thickness direction of the transparent cover glass;

wherein material of the transmission reinforcement layer is formed by an ultraviolet curable resin, and the transmission reinforcement layer has a thickness of 0.5 μm-5 μm;

wherein the ultraviolet curable resin comprises the following components based on 100 parts by mass:

60 parts to 80 parts of an organic monomer, 10 parts to 30 parts of a diluent, 0.01 parts to 1 part of a photoinitiator, 0.2 parts to 2 parts of a stabilizer, 0.2 parts to 2 parts of a leveling agent, 0.3 parts to 2 parts of a defoaming agent and 0.5 parts to 3 parts of a plasticizer;

wherein the organic monomer is at least one selected from the group consisting of acrylic ester, epoxy resin and vinyl ether;

the diluent is at least one selected from the group consisting of tripropylene glycol diacrylate, trimethylolpropane triacrylate, ethoxylated trimethylolpropane triacrylate, dipentaerythritol hexaacrylate, 1,6-hexanediol methoxy monoacrylate, and ethoxylated neopentyl glycol methoxy monoacrylate;

the photoinitiator is at least one selected from the group consisting of aromatic diazonium salt, aromatic sulfonium salt, aromatic iodonium salt and ferrocenium salt;

the stabilizer is at least one selected from the group consisting of hydroquinone, p-methoxyphenol, p-benzoquinone, 2,6-di-t-butyl methyl phenol, phenothiazine, and anthraquinone;

the leveling agent is at least one selected from the group consisting of polyacrylate, cellulose acetate butyrate, nitrocellulose and polyvinyl butyral;

the defoaming agent is at least one selected from the group consisting of phosphate defoaming agent, fatty acid ester defoaming agent and silicone defoaming agent; and the plasticizer is at least one selected from the group consisting of phthalic acid ester, diisononyl phthalate, diisodecyl phthalate and trimellitic acid ester.

10. The double-layer touch screen according to claim 9, wherein material of the first conductive layer is metal or alloy thereof, carbon nanotube, graphene, organic conductive polymer, or ITO; and material of the second conductive layer is metal or alloy thereof, carbon nanotube, graphene, organic conductive polymer, or ITO.

11. The double-layer touch screen according to claim 10, wherein the metal is at least one selected from the group consisting of gold, silver, copper, aluminum, nickel and zinc.

12. The double-layer touch screen according to claim 9, wherein the conductive wires of the first and second transparent embossed adhesive layers each has a width of 0.2 μm-5 μm and a thickness of 1 μm-10 μm, an intersection point of any two intercrossing conductive wires forms a node, and the distance between any two adjacent nodes is 50 μm-500 μm.

13. The double-layer touch screen according to claim 9, wherein material of the first transparent embossed adhesive layer and the second transparent embossed adhesive layer is a heat curable resin or an ultraviolet curable resin; and the first transparent embossed adhesive layer has a thickness of 1 μm-10 μm, and the second transparent embossed adhesive layer has a thickness of 1 μm-10 μm.

14. The double-layer touch screen according to claim 9, wherein the transparent cover glass is an aluminosilicate glass or a soda lime glass and has a thickness of 0.3 mm-1.2 mm, and Si—O groups on said one surface of the transparent cover glass bond to the first transparent embossed adhesive layer.

15. The double-layer touch screen according to claim 9, wherein said one surface of the transparent cover glass has a roughness of 2 nm-8 nm.

16. The double-layer touch screen according to claim 9, wherein the first conductive layer is separated from the transparent cover glass by the first transparent adhesive layer.

* * * * *